March 20, 1956     A. R. NORDEN     2,739,272
CIRCUIT BREAKER BUSSING ARRANGEMENT
Filed March 13, 1952     2 Sheets-Sheet 1
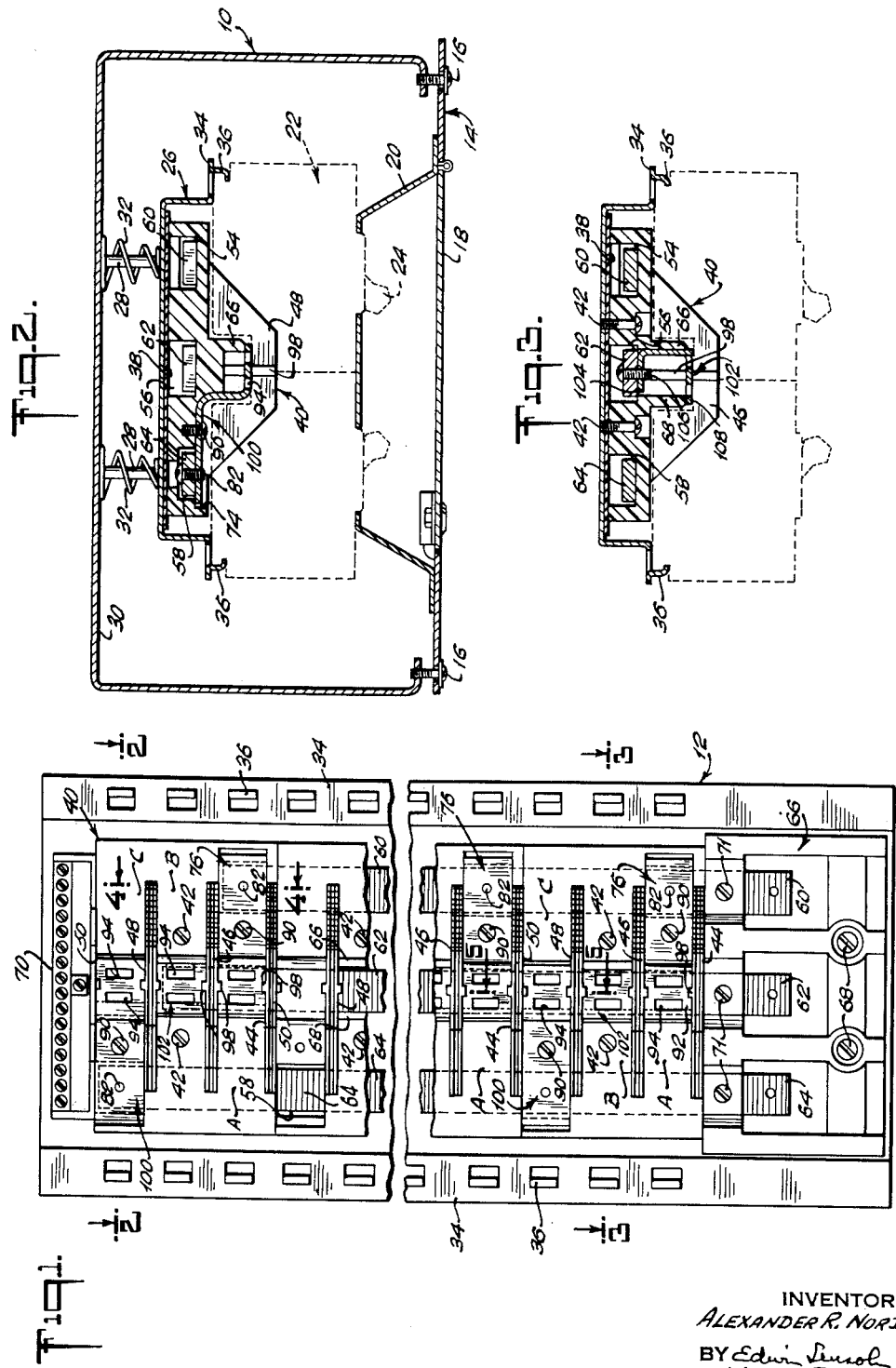
INVENTOR
ALEXANDER R. NORDEN.
BY Edwin Lukoh +
Harry Cohn
ATTORNEYS

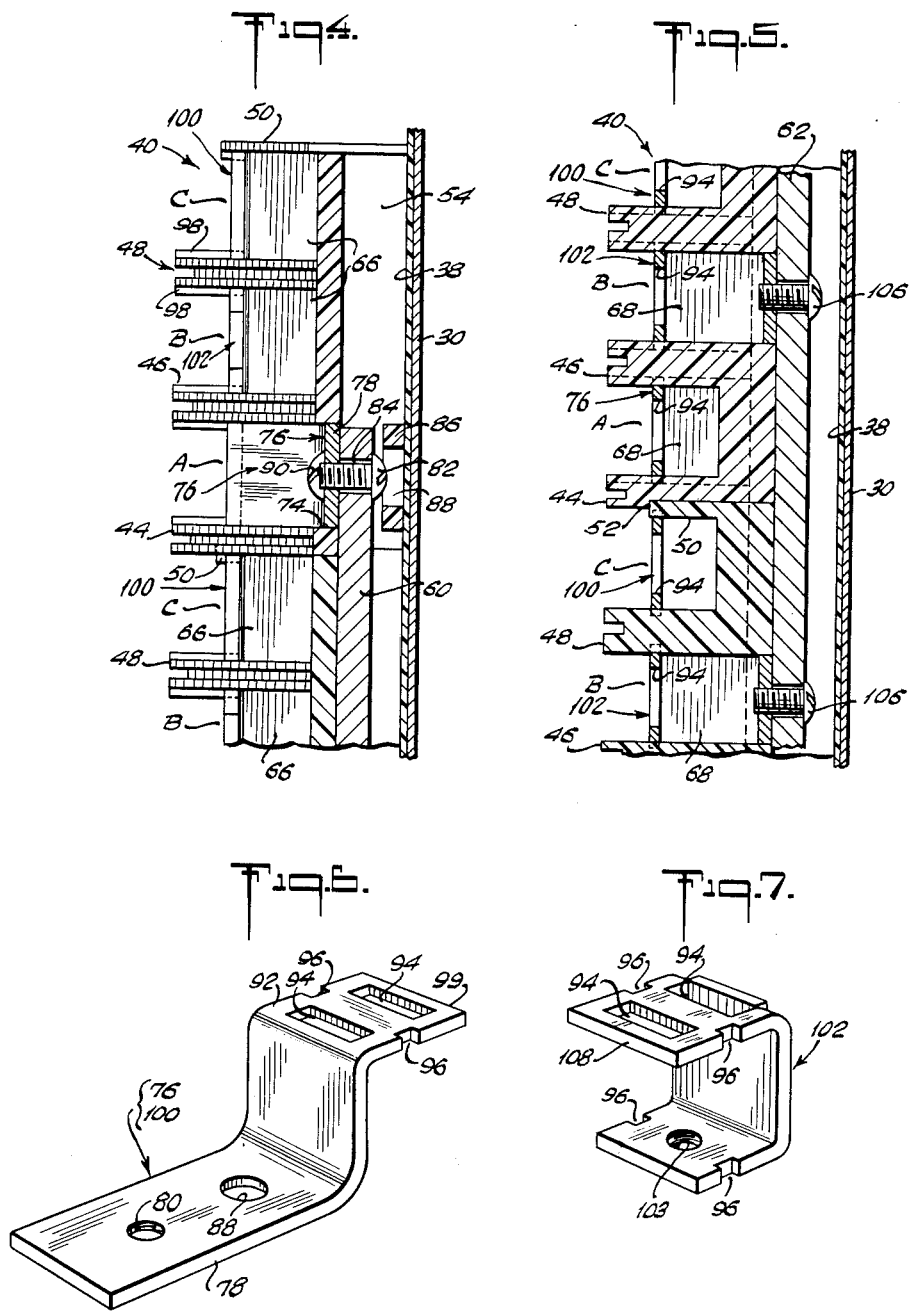

United States Patent Office 2,739,272
Patented Mar. 20, 1956

2,739,272

CIRCUIT BREAKER BUSSING ARRANGEMENT

Alexander R. Norden, New York, N. Y., assignor to Federal Electric Products Company, Newark, N. J., a corporation of Delaware Application March 13, 1952, Serial No. 276,415

6 Claims. (Cl. 317—119)

This invention relates in general to panel boards for circuit breakers or other electric devices and, in particular, to mounting pan constructions for said panel boards.

The primary object of the present invention is the provision of a mounting pan provided with a generally improved bus bar arrangement and having generally improved means for mounting circuit breakers or other electric instrumentalities thereon for connection with said bus bars.

Another object is the provision of a mounting pan construction especially adapted for a three-phase, four wire circuit.

Another object is to obtain a saving in the use of bus bar metal for a three-phase, four wire circuit.

A further object is an improved terminal connector and circuit breaker mount especially adapted for use with a three-phase, four wire circuit.

The above and other objects, features and advantages of the present invention will be more fully understood from the following description considered in connection with the accompanying illustrative drawings.

In the drawings:

Fig. 1 is a plan view of a mounting pan construction pursuant to the present invention;

Fig. 2 is a sectional view taken on the line 2—2 of Fig. 1, including the enclosure for the mounting pan;

Fig. 3 is a sectional view taken on the line 3—3 of Fig. 1;

Fig. 4 is a sectional view, on a larger scale, taken on the line 4—4 of Fig. 1;

Fig. 5 is a sectional view, on a larger scale, taken on the line 5—5 of Fig. 1; and Figs. 6 and 7 are perspective views of terminal elements pursuant the present invention.

Referring now to the drawings in detail, there is shown a box or enclosure 10 (Fig. 2) for an electric panel board 12. As is well known to those skilled in the art, said enclosure may be of the type adapted for flush or surface mounting on a wall. Enclosure 10 is provided with a front trim member 14, which is removably secured thereto, as by the bolts 16, and which has a front door or closure 18. The trim member is provided with a shield or barrier 20 which abuts the electrical devices, such as the circuit breakers 22, illustrated in phantom herein. The shield 20 prevents access to the interior of the enclosure, but provides access to the operating elements or handles 24 of the circuit breakers when the closure 18 is open.

As here shown, the enclosure 10 is provided with a "plaster adjustment" for the circuit protective devices, where said enclosure is to be flush mounted in a wall. In this connection, the mounting pan 26 is resiliently mounted within the enclosure, as to be urged toward the front of the enclosure for adjusting the mounting pan to expeditiously align the circuit protective devices with the face of the enclosure, and the wall surface, by biasing said devices against the protective shield 20. Said resilient mounting means may be of any suitable type and, as here shown, is of the general type illustrated and described in the co-pending application of Ervin E. Wills, Serial No. 255,117, filed November 6, 1951, and assigned to the assignee hereof. The pan mounting means, here shown, is constituted by the posts or rods 28, which extend outwardly from the rear wall 30 of the enclosure 10 and are slidably engaged in the pan 26. Each rod is provided with a resilient volute member, constituted by a helically coiled tapered spring member 32, which is disposed between the rear wall 30 and the mounting pan 26 to bias the latter toward the front of the enclosure 10. It will be understood that, when mounted within the enclosure, the pan is supported and positioned therein preferably by a post 28 at each corner thereof, as fully illustrated in said co-pending application, and that the spring members 32 tend to yieldingly resist the rearward movement of the pan toward the rear wall.

The pan 26 is preferably formed of suitable sheet metal and is provided adjacent the side edges thereof with the flange portions 34, which may be secured thereto in any suitable manner manner or which may be integral therewith. Said flange portions are provided with the struck-out formations or retaining elements 36 which are adapted to engage in complementary recesses provided in the casing of the circuit breakers 22, as best illustrated in Figs. 2 and 3. Extending longitudinally thereof, and between the portions 34 at the sides of the pan, there is provided a sheet 38 of suitable insulation material. The pan is also provided with electric device mounting units 40 which are disposed on the insulation layer between the retaining portions 34 of the pan.

The mounting units 40 are formed of a suitable insulation material, and each is secured in position on the pan by the screws 42. Each unit 40 is adapted to mount six circuit breakers 22, in sets of three pairs, the circuit breakers in each pair being in end-to-end relation. Unit 40 is provided with the raised transversely extending barrier portions 44, 46, 48 and 50 which define the sections A, B and C thereon. Each section is adapted to mount a pair of circuit breakers. It will be noted from Figs. 4 and 5 that the barrier 50 is shorter than the barrier members 44, 46 and 48, said barrier 50 being at one end of the mounting unit and the barrier 44 being at the other end thereof. The barrier 44 is provided with a recess 52 in the outer surface thereof in order to receive the barrier 50 of an adjacent mounting unit, so that said barrier 50 will nest within the barrier 44, as best illustrated in Fig. 5. Each mounting unit 40 is provided with three parallel passages or guideways 54, 56 and 58 which extend therethrough, transversely of the previously mentioned barriers thereof. Said passageways are adapted to receive the companion bus bars 60, 62 and 64, respectively, of a three-phase, four wire circuit.

At one end thereof, the mounting pan 26 is provided with a housing 66, formed of insulation material, which is suitably secured thereto, as by the screws 68. At the other end thereof, the pan is provided with a neutral terminal assembly 70 for said circuit, and the bus bars extend through the housing 68 toward the terminal assembly 70. The bus bars are secured to the housing by the screws 71. It will be understood that the ends of the bus bars, which are disposed within the housing 66, are adapted to be connected to companion power lines for the three-phase circuit.

In addition to the previously mentioned barriers 44 through 50, the mounting unit 40 is also provided with additional barrier portions which extend transversely of and between said first mentioned barriers. More particularly, section B is provided with the spaced opposing barrier portions 66 and 68, respectively, as illustrated in Fig. 3. Section C is provided only with a barrier portion 66, as illustrated in Fig. 2, and section A is provided only with a barrier portion 68, as illustrated in Fig. 5. Provision is made for connecting the pair of circuit breakers which will be mounted in section A, between the barrier members 44 and 46, to the bus bar 60. As previously indicated, said bus bar is disposed in the guideway 54 which underlies the mounting devices. The mounting device is cut away, as illustrated at 74 in Fig. 4, to expose the bus bar 60. A terminal element 76 is disposed between the barriers 46 and 44. More specifically, said terminal element is provided with a portion 78 which abuts the bus bar 60, a threaded aperture 80 being provided in said portion to receive a conducting screw 82 which extends through an aperture 84 provided in the bus bar and connects the bus bar and the terminal element 76. The mounting member is provided with an integral portion 86 which underlies the guideway 54 at the cut-out 74 thereof. Said portion 86 is provided with an aperture 88 through which the screw 82 may be inserted for its entry into the bus bar 60 and the terminal member 76. Adjacent the aperture 80, the terminal member 76 is provided with an additional aperture 88 for receiving a screw 90 which is threaded into an underlying portion of the mounting unit for securing the terminal element 76 thereto. Said terminal element is also provided with an integral terminal connector portion 92 provided with the spaced rectangular terminal slots 94—94. Said portion 92 is also provided with the peripheral recesses or notches 96—96 which engage the vertically extending ribbed portions 98—98 on the confronting surfaces of the barrier members 44 and 46. Therefore, it will be readily apparent that the ribs and the confronting surfaces of the barrier members 44 and 46 serve to retain the terminal member 76 in position and prevent the displacement thereof. As previously indicated, the barrier member 66 is omitted between the side barriers 44 and 46, and it will be understood that the free end 99 of the terminal member 76 is supported on the upper edge of the barrier member 68 between the side barriers 44 and 46 so that the portion 92 will not bend or distort upon insertion of the circuit breakers in the slots thereof.

The terminal member 100 which extends between the side barriers 48 and 50 is similar in construction to the terminal member 76, said members being interchangeable. As previously indicated, while the barrier member 66 extends between the side barriers 48 and 50, the companion barrier member 68 is omitted between said side barriers, so that the free end of the terminal member 100 is supported on the upper edge of the barrier 66 between the side barriers 48 and 50, as illustrated in Fig. 2. Said terminal member 100 is connected to the bus bar 64 in substantially the same manner as the manner in which the terminal member 76 is connected to the bus bar 60. In this connection, it will be noted from Fig. 2 that the mounting unit 40 is provided with a cut-out 74 between the side barriers 48 and 50, to provide for the abutment of the terminal member 100 and the bus bar 64. A screw 82 interconnects said latter bus bar and terminal member in the same manner as that previously described in connection with the terminal member 76 and the bus bar 60.

The slotted portions 94 in the terminal members 76 and 100 are adapted to receive prongs or stab terminals provided on the circuit breakers for effecting electrical connection between the circuit breakers and the companion bus bars. Said prongs or stab terminals are preferably of the type fully illustrated and described in the co-pending United States application of Thomas M. Cole and Paul M. Christensen, Serial No. 127,432, filed November 15, 1949, and assigned to the assignee hereof. From the foregoing, it will be readily apparent that each terminal member 76 or 100 provides for the electrical connection of a pair of end-to-end circuit breakers to the outer bus bar to which the particular terminal member is electrically connected, the circuit breakers being engaged between a holding element 36 and an aligned slot 94.

In order to effect electrical connection to the intermediate bus bar 62, provision is made for the terminal element 102 which is disposed between the side barriers 46 and 48. It will be noted from Fig. 3 that the mounting unit is cut away between the companion barriers 66 and 68 and the side barriers 46 and 48, as at 104. The terminal member 102 is disposed in said cut-out for abutment with the underlying bus bar 62, a conducting screw 106 threaded into opening 103 effecting electrical connection therebetween. The terminal element 102 is also provided with the peripheral notches 96 in which the ribs 98, disposed on the confronting surfaces of the side barriers 46 and 48, are received. The upper free end 108 of the terminal member 102 is supported and maintained in position on the upper edge of the barrier member 68 between said side barriers. It will be noted that the terminal member 102 is also provided with the slotted portions 94 adapted to receive the prongs or stab elements of a pair of circuit breakers for connecting the latter to the intermediate bus bar 62.

Pursuant to the present invention, it will be apparent that any desired number of mounting units 40 may be disposed in end-to-end relation on the mounting pan 26. While each bus bar extends from the insulated housing 66, where it is connected to a companion power line, it will be noted that they terminate at different points. In this connection, it will be noted that the terminal member 76, at one side of the unit 40, is closest to the housing 66, the terminal member 100, at the other side of the unit 40, is farthest therefrom, and the central terminal member 102, being intermediate said other terminal members, is at an intermediate distance from the housing. Therefore, it will be readily apparent that the bus bar 60 will be the shortest of the three bus bars since it need extend only to the point where it makes contact with a terminal member 76 of a mounting unit 40. The bus bar 64 will be the longest of the bus bars since it must make contact with the most distant terminal member 100 of a mounting unit, and the length of the bus bar 62 is of a length intermediate the length of the other bus bars since it need extend only to the point where it makes contact with an intermediate terminal member 102. Therefore, it will be readily apparent that by using the shorter bus bars 60 and 62, as compared with the bus bar 64, there is a resultant saving in bus bar metal.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. A panel-board mounting unit for circuit protective devices comprising an insulated member having parallel lateral guideways defined between opposing surfaces thereof and each adapted to receive a bus bar, integral barrier portions on said member defining mounting sections thereon each adapted to mount a pair of said devices, and a terminal member disposed in each mounting section and extending into one of said guideways for connection to one of said bus bars, respectively, whereby to connect the devices in each section to the same bus bar, respectively, said terminal members having connector portions aligned in a row in the direction of said guideways.

2. A panel-board mounting unit for circuit protective devices comprising an insulated member having parallel guideways each adapted to receive a bus bar, integral barrier portions on said member defining mounting sections thereon each adapted to mount a pair of said devices, and a terminal member disposed in each mounting section for connection to one of said bus bars, respectively, whereby to connect the devices in each section to the same bus bar, respectively, said barriers being provided with confronting ribs, and said terminal members being provided with notched portions for engaging said ribs, whereby to retain said terminal members against displacement.

3. A panel-board mounting unit for circuit protective devices comprising an insulated member having parallel guideways each adapted to receive a bus bar, integral barrier portions on said member defining mounting sections thereon each adapted to mount a pair of said devices, and a terminal member disposed in each mounting section for connection to one of said bus bars, respectively, said terminal members having slotted terminal connector portions whereby to connect the devices in each section to the same bus bar, respectively, and additional barrier portions extending transversely of said first mentioned barrier portions and underlying said connector portions, respectively, of said terminal members, whereby to prevent possible distortion of said terminal members upon engagement of said protective devices therewith.

4. A panelboard construction comprising a panel, means mounting three bus bars in disposition longitudinally of said panel and spaced laterally of each other transversely of said panel, a terminal element electrically connected to and extending from each of the outer bus bars toward the intermediate bus bar, each of said terminal elements having a portion provided with a pair of terminals which overlie said intermediate bus bar, and said intermediate bus bar having a terminal element electrically connected to and extending therefrom, said latter element having a portion provided with a pair of terminals which also overlie said intermediate bus bar, said terminals being aligned longitudinally of said panel, whereby to provide two rows of terminals which extend between the outer bus bars and which overlie the intermediate bus bar, and insulated barrier portions provided on said bus bar mounting means and extending between said terminal elements, respectively, to define mounting sections each of which is adapted by the associated terminal element to electrically connect a pair of electrical devices to one of said bus bars.

5. A panelboard construction comprising a panel, means mounting three bus bars in disposition longitudinally of said panel and spaced laterally of each other transversely of said panel, a terminal element electrically connected to and extending from each of the outer bus bars toward the intermediate bus bar, each of said terminal elements having a portion provided with a pair of terminals which overlie said intermediate bus bar, and said intermediate bus bar having a terminal element electrically connected to and extending therefrom, said latter element having a portion provided with a pair of terminals which also overlie said intermediate bus bar, said terminals being aligned longitudinally of said panel, whereby to provide two rows of terminals which extend between the outer bus bars and which overlie the intermediate bus bar, all of said portions being a free end of the respective terminal which is offset therefrom to overlie the intermediate bus bar, and insulated barrier portions provided on said bus bar mounting means and extending between said terminal elements, respectively, to define mounting sections each of which is adapted by the associated terminal element to electrically connect a pair of electrical devices to one of said bus bars.

6. A panelboard construction comprising a panel, means mounting three bus bars in disposition longitudinally of said panel and spaced laterally of each other transversely of said panel, a terminal element electrically connected to and extending from each of the outer bus bars toward the intermediate bus bar, each of said terminal elements having a portion provided with a pair of terminals which overlie said intermediate bus bar, and said intermediate bus bar having a terminal element electrically connected to and extending therefrom, said latter element having a portion provided with a pair of terminals which also overlie said intermediate bus bar, said terminals being aligned longitudinally of said panel, whereby to provide two rows of terminals which extend between the outer bus bars and which overlie the intermediate bus bar, all of said portions being a free end of the respective terminal which is offset therefrom to overlie the intermediate bus bar, said terminals being constituted by a pair of slots defined in each of said free ends, respectively, and said panel having support means underlying each of said free ends to prevent possible distortion thereof resulting from the plug-in engagement of circuit breakers in said slots, respectively, and insulated barrier portions provided on said bus bar mounting means and extending between said terminal elements, respectively, to define mounting sections each of which is adapted by the associated terminal element to electrically connect a pair of electrical devices to one of said bus bars, and said panel support means comprising additional barrier portions extending transversely of said first mentioned barrier portions and underlying said free ends, respectively, of said terminals.

References Cited in the file of this patent

UNITED STATES PATENTS

| | | |
|---|---|---|
| 1,203,582 | Chase | Nov. 7, 1916 |
| 1,872,296 | Jennings | Aug. 16, 1932 |
| 1,902,790 | Starrett | Mar. 21, 1933 |
| 2,007,174 | Benjamin | July 9, 1935 |
| 2,351,942 | Dyer | June 20, 1944 |
| 2,530,548 | Stanley | Nov. 21, 1950 |
| 2,599,695 | Christensen | June 10, 1952 |
| 2,632,039 | Hammerly et al. | Mar. 17, 1953 |